United States Patent [19]

Halfhill

[11] 4,058,759
[45] Nov. 15, 1977

[54] POWER SUPPLY FOR COMPUTER PERIPHERAL DEVICE

[75] Inventor: Martin O. Halfhill, San Jose, Calif.

[73] Assignee: Xerox Corporation, Stamford, Conn.

[21] Appl. No.: 633,516

[22] Filed: Nov. 19, 1975

[51] Int. Cl.² .................. H02K 47/00; H02M 5/32
[52] U.S. Cl. ............................ 322/13; 307/16; 322/90; 363/126
[58] Field of Search ............ 322/4, 13, 14, 16, 39, 322/90; 321/63; 360/78; 307/16, 150, 149, 154

[56] References Cited

U.S. PATENT DOCUMENTS

| | | | |
|---|---|---|---|
| 3,267,353 | 8/1966 | Franklin | 322/90 |
| 3,784,894 | 1/1974 | Silvertown | 322/90 X |
| 3,866,442 | 2/1975 | Kouril et al. | 322/4 X |
| 3,924,268 | 12/1975 | McIntosh et al. | 360/78 |

Primary Examiner—Robert J. Hickey
Attorney, Agent, or Firm—M. J. Colitz; T. J. Anderson; B. P. Smith

[57] ABSTRACT

In a computer peripheral device having a controllable element and control means coupled to the controllable element and operative in response to a power supply voltage of a predetermined level for controlling the controllable element, an improved power supply means coupled to the control means for supplying said power supply voltage to the control means. The improved power supply means comprises a motor capable of being driven at a predetermined rate of speed, means coupled to the motor and responsive to the motor being driven at the predetermined rate of speed for generating the power supply voltage, and means coupled to the means for generating for supplying the power supply voltage to the control means.

15 Claims, 10 Drawing Figures

POWER SUPPLY FOR COMPUTER PERIPHERAL DEVICE

BACKGROUND OF THE INVENTION

This invention relates to computer peripheral devices (e.g. disk drives, printers, etc.) and, more particularly, to an improved power supply for a computer peripheral device.

Most computer peripheral devices include a controllable element, control means coupled to the controllable element and operative in response to a power supply voltage of a predetermined level for controlling the controllable element, and power supply means coupled to the control means for supplying the power supply voltage to the control means. For example, a disk drive includes a movable carriage assembly to which one or more electromagnetic heads are affixed. The heads are then positionable over a desired track on a rotating magnetic recording disk by controlling the position of the carriage assembly. Positioning control is accomplished by a suitable servo control system. A power supply supplies the requisite d-c voltage or voltages to render the servo control system operative.

Power supplies commonly used nowadays in computer peripheral devices are characterized by a transmission line coupled to a source of a-c voltage, generally at a frequency of 50Hz or 60Hz, for supplying such a-c voltage to a rectifier circuit, usually a full-wave rectifier. The rectifier then generates a d-c voltage which, in the case of full-wave rectification, has a ripple frequency equal to twice the frequency of the a-c source, i.e. 100Hz or 120Hz. The output of the rectifier is then fed through an appropriate filter circuit to smooth out the ripple.

These power supplies suffer from a number of disadvantages. First, the relatively low ripple frequency (e.g. 50Hz or 60Hz in the case of half-wave rectification and 100Hz or 120Hz in the case of full-wave rectification) requires a relatively large and expensive filter capacitor. Second, the power supply is subject to electrical noise and signal transients in the a-c signal transmitted over the transmission line from the a-c voltage source to the rectifier circuit. Third, should the a-c source voltage be terminated or reduced in amplitude for brief instants of time, such as during so-called "brown-outs" or "black-outs", the d-c voltage output of the supply will likewise terminate or be reduced in amplitude, as the case may be. Fourth, these power supplies as a whole are relatively costly and large in size, thereby adding to the cost and size of the peripheral devices in which they may be included. Fifth, these known power supplies are relatively inefficient.

It would be desirable, therefore, to provide a power supply for a computer peripheral device which is substantially free of the above-mentioned disadvantages.

SUMMARY OF THE INVENTION

In accordance with the present invention, an improved power supply is provided for a computer peripheral device of the type including a controllable element and control means coupled to the controllable element and operative in response to a power supply voltage of a predetermined level for controlling the controllable element. The improved power supply includes a motor capable of being driven at a predetermined rate of speed, means coupled to the motor and responsive to the motor being driven at the predetermined rate of speed for generating the power supply voltage, and means coupled to the means for generating for supplying the power supply voltage to the control means. The means for generating desirably includes an alternator coupled to and driven by the motor for generating an output signal, and means for deriving the power supply voltage from the output signal.

Since the power supply voltage is derived from the alternator which is mechanically coupled to the motor, the power supply voltage will be substantially free of noise and signal transients in the a-c signal operating the motor as transmitted along a transmission line from an a-c source. Further, during brief periods of a-c source cessation or reduction, the inertia of the motor-alternator system is such that the power supply will continue to deliver an acceptable power supply voltage. It should be clear that inertia could be added to the motor-alternator system to achieve any reasonable time constant to withstand brown-out or black-out periods.

In a preferred embodiment of the invention, the power supply is used in a disk drive to supply d-c power to the various electronic circuits thereof. The disk drive preferably includes a linear actuator of the general type disclosed and claimed in copending U.S. application Ser. No. 579,432 (now U.S. Pat. No. 4,034,613) filed on May 21, 1975 be Messrs. Halfhill and Brunner as a divisional of copending U.S. application Ser. No. 486,408 (now U.S. Pat. No. 3,922,718) filed on July 8, 1974. This linear actuator makes use of the principle that a roller frictionally engaged with the cylindrical surface of a drive shaft will be rotated about its axis by rotation of the drive shaft when such axis is parallel to the axis of the drive shaft, and will additionally be moved linearly in a direction parallel to the axis of the drive shaft when the roller is oblique to the axis of the drive shaft.

In general terms, therefore, the linear actuator disclosed in the aforesaid copending applications Ser. Nos. 486,408 and 579,432 includes a drive shaft having a cylindrical surface, means for rotatably mounting the drive shaft to a support frame for rotation of the drive shaft about its axis, means for rotating the drive shaft about its axis, a carriage to be driven, a roller, means for mounting the roller to the carriage with the roller being rotatable about a first axis and pivotable about a second axis perpendicular to the first axis, means for mounting the carriage to the support frame with the carriage being movable relative to the support frame along the predefined linear path and with the roller being in frictional engagement with the cylindrical surface of the drive shaft whereby the roller is caused to rotate about its first axis by rotation of the drive shaft when the first axis is parallel to the axis of the drive shaft and is additionally caused to move along the predefined linear path during rotation of the drive shaft when the first axis is oblique to the axis of the drive shaft, and means for controllably pivoting the roller about its second axis to control movement of the roller and thus the carriage along the predefined linear path.

The means for rotating the drive shaft about its axis preferably comprises a motor. Therefore, for very little additional cost, an alternator can be coupled to and driven by the motor with an appropriate rectifier and filter circuit coupled to the output of the alternator to generate the requisite d-c power supply voltage or voltages to operate the various electronic circuits of the disk drive, such as those included in the servo control system for controlling the linear position of the head-carriage assembly.

In the preferred embodiment, the alternator has a 3-phase output and thereby generates 3 a-c output signals of a desired amplitude which are phase-displaced by 120°. Each a-c output signal preferably has a frequency of about 67Hz. All three output signals are then fed through a full-wave rectifier circuit which generates a corresponding d-c signal having a ripple frequency of about 400Hz. By virtue of this relatively high ripple frequency, a relatively small and inexpensive filter capacitor need by employed, thereby further reducing the overall cost of the power supply and rendering it more efficient.

These and other aspects and advantages of the present invention will be more completely described below with reference to the accompanying drawings.

DESCRIPTION OF THE PREFERRED EMBODIMENT

Figure 1:
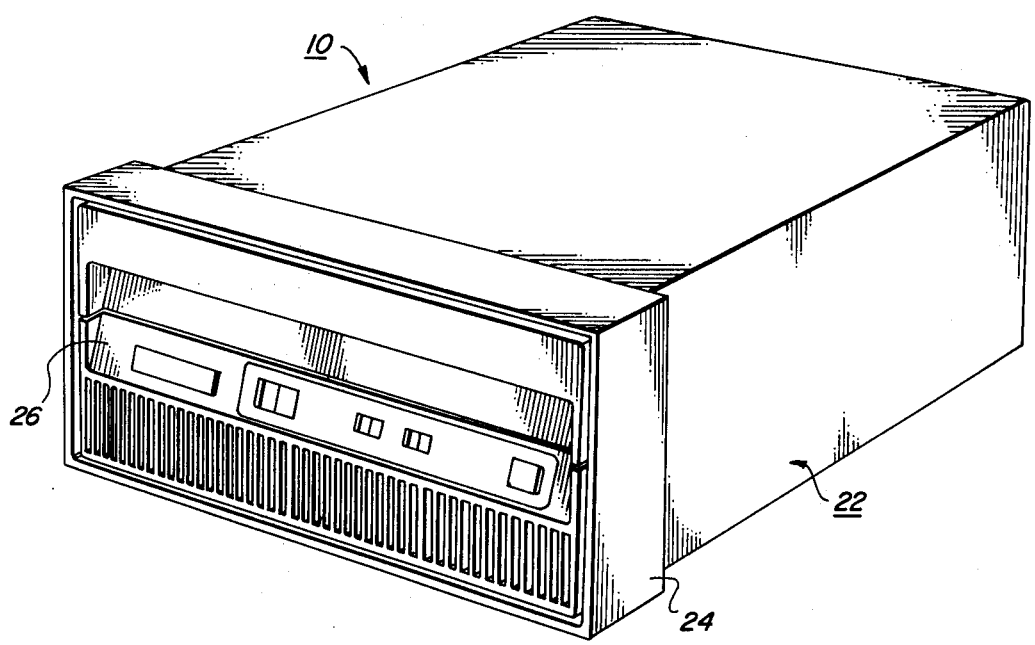
FIG. 1 is a perspective view of a disk drive embodying the improved power supply of the present invention.

Referring to FIGS. 1 – 4, a disk drive 10 is shown including an improved linear actuator 12 (shown in FIG. 2 only) for controlling the linear positioning of a plurality of electromagnetic heads 14a – 14h relative to a plurality of coaxially stacked magnetic recording disks 16a – 16d. Details of the linear actuator 12 will be described in more detail below in connection with FIGS. 2 and 5 – 9. The disk drive 10 also includes an improved power supply 18 (FIG. 10) for supplying the requisite d-c voltages for disk drive operation. Details of the power supply will be described in more detail below in connection with FIGS. 2 – 4 and 10.

Although the improved linear actuator 12 and the improved power supply 18 are shown as being included in and forming part of a specific disk drive 10, it will become clear from the description to follow that they could equally well be utilized in other machines and devices, including other computer peripheral devices, such as output printers, terminals and the like. Thus, the description of the linear actuator 12 and power supply 18 in the context of a disk drive, especially the specific disk drive 10, is merely by way of example.

The disk drive 10 includes a main support frame or casting 20 (FIGS. 2 and 3) about which a housing cover 22 (FIG. 1) is mounted by suitable mounting means (not shown). The housing cover 22 includes a front portion 24 in which a suitable control and display panel 26 may be mounted. The portion is hinged by suitable means (not shown) about its inward most lower edge so that it may be swung open. In this manner, a disk cartridge 28 including the disk 16a therein may be inserted into the disk drive 10 and loaded about a drive spindle 30 for rotating the disk 16a about the axis of the spindle 30.

The drive spindle 30 forms part of a spindle assembly 32 which includes a housing 34 fixedly mounted by suitable mounting means (not shown) to a forward platform portion 36 of the support frame 20. The housing 34 extends through an opening 38 in the platform portion 36 and the spindle 30 has upper and lower portions 40 and 42 which respectively extend from the upper and lower ends of the housing 34. The upper portion 40 of the spindle 30 is preferably in the form of a circular disk having a permanently magnetized side peripheral surface 44. The surface 44 is adapted to attract an upper hub (not shown) fabricated of an appropriate magnetically attractable material and mounted in the cartridge 28 through the central opening of the disk 16a. The resultant magnetic field is made strong enough so that the resultant force holding the upper hub against the upper portion 40 of the spindle 30 is sufficient to prevent slippage therebetween during normal acceleration and deceleration of the disk 16a.

The lower portion 42 of the spindle 30 is preferably in the form of a cylindrical shaft having a lower hub 48 fixedly connected about its periphery by suitable connecting means (not shown). The hub 48 extends sufficiently in a radial direction so that the inner-most portion of the lower surface of the disk 16d is supported thereby (see FIG. 3). The disk 16d constitutes the lowest disk in a stacked array of three coaxially aligned disks 16b – 16d which are permanently mounted in the disk drive 10. This is to be distinguished from the disk 16a which is included in the cartridge 28 which is removable from the disk drive. The specific manner in which the cartridge 28 may be inserted and removed from the disk drive 10 does not form part of the present invention and so will not be described in detail herein. It should be noted, however, that any suitable well known cartridge loading apparatus may be employed. It should be further noted that any one or more of the disks 16a – 16d may be deleted from the drive 10, if desired.

Figure 3:
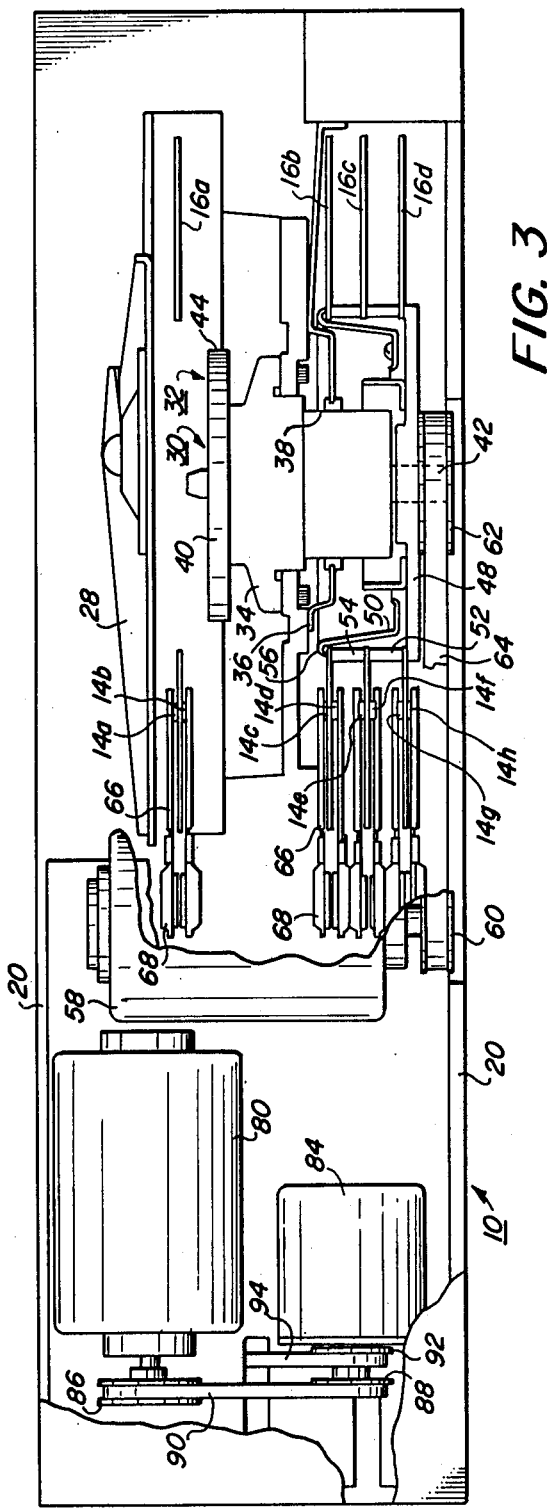
FIG. 3 is a side elevation view of the disk drive of FIG. 2 with certain components of the drive deleted for clarity of others.

Referring specifically to FIG. 3, the non-removable disks 16b – 16d are permanently mounted within the disk drive 10 for simultaneous coaxial rotation upon rotation of spindle 30. This is accomplished by means of a clamping ring 50 and two annular spacers 52 and 54. Specifically, the spacer 52 is disposed between the upper surface of the disk 16d and the lower surface of the disk 16c at the inner-most portions of such disks, and the spacer 54 is disposed between the upper surface of the disk 16c and the lower surface of the disk 16b at the inner-most portions of each. The clamp 50 is bolted at one end to the lower hub 48 and has an annular lip 56 at its other end which is forced down upon the upper surface of the disk 16b thereby applying a clamping force to retain the spacers 52 and 54 in tight fitting relationship. The clamping force is made sufficiently great so that a rotation of the hub 48 will cause a corresponding rotation of each of the disks 16b - 16d.

The spindle 30 is rotated to cause simultaneous rotation of the disks 16b - 16d, as well as the disk 16a should the cartridge 28 be loaded into the disk drive 10, by means of a disk drive motor 58, a first pulley 60 mounted to the drive shaft of the motor 58, a second pulley 62 mounted to the lower shaft portion 42 of the spindle 30 and a drive belt 64 stretched between and about the pulleys 60 and 62. Thus, as the motor drive shaft is rotated by operation of the motor 58, the rotary action of such drive shaft will be transferred to the lower shaft portion 42 of the spindle 30, thereby causing the spindle 30 to rotate.

As best shown in FIG. 3, each of the disks 16a - 16d has associated therewith a pair of electromagnetic read/write heads, disposed upon either side of the disk. Thus, heads 14a and 14b are disposed on either side of disk 16a, heads 14c and 14d on either side of disk 16b, heads 14e and 14f on either side of disk 16c, and heads 14g and 14h on either side of disk 16d. Each head 14a - 14h is supported on an arm 66 which is, in turn, connected to an arm mounting piece 68. The arms 66 and mounting pieces 68 are identical for each head.

The two mounting pieces 68 associated with the heads 14a and 14b are connected to a common receiver plate 70 (FIGS. 2, 5 and 7) which is, in turn, mounted by suitable means (not shown) to an upper carriage 72 forming part of the improved linear actuator 12 which will be described in more detail below in connection with FIGS. 5 - 9. The six mounting pieces 68 associated with the six heads 14c - 14h are connected to a common receiver plate (not shown) similar to the plate 70 which is, in turn, mounted by suitable means (not shown) to a lower carriage 78 also forming part of the linear actuator 12. As shall become clear below, the carriages 72 and 78 are independently movable in parallel linear directions so that the heads 14a and 14b may be positioned independently of the heads 14c - 14h.

Figure 2:
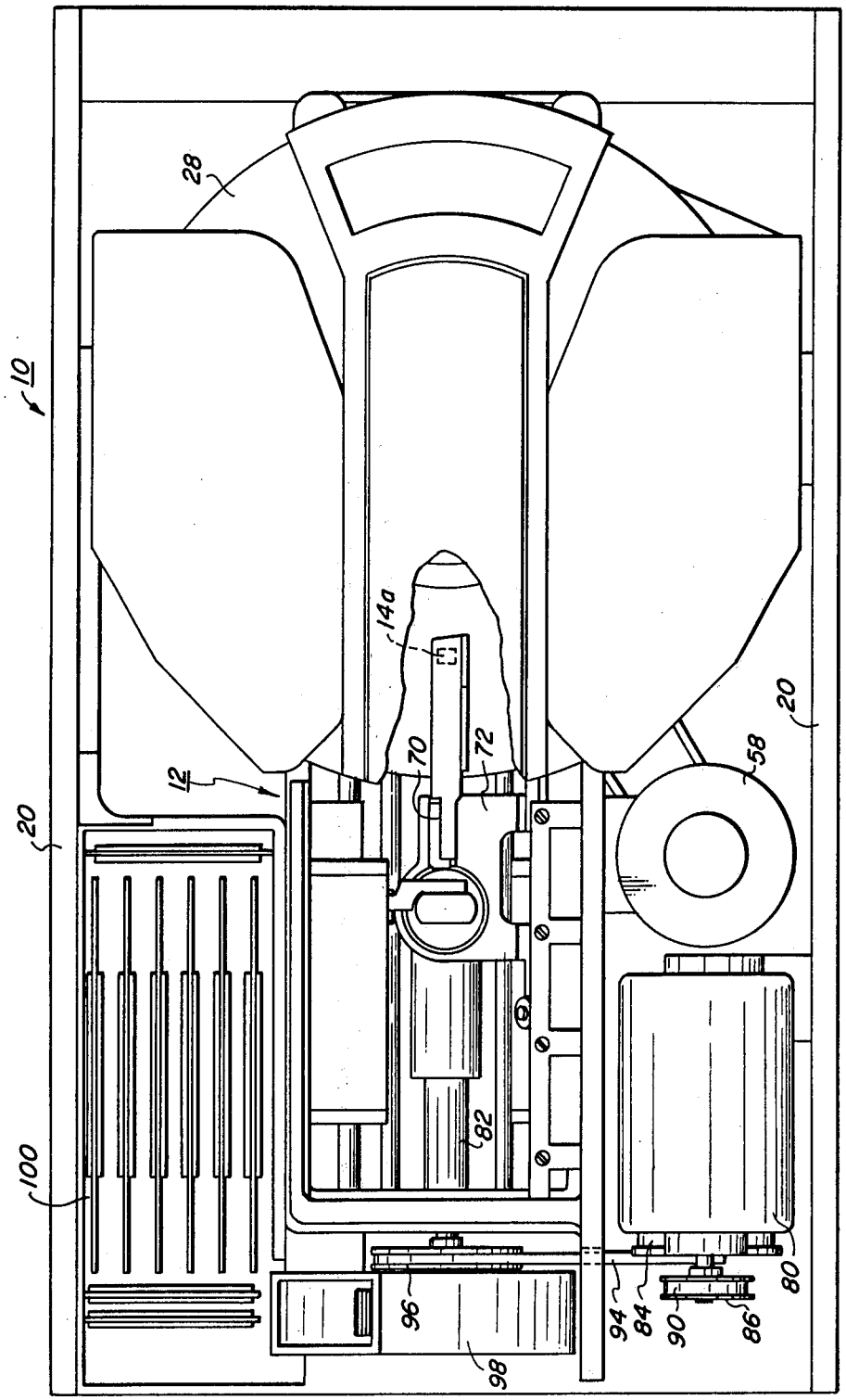
FIG. 2 is a top elevation view of the disk drive of FIG. 1 with the housing cover removed.
Figure 4:
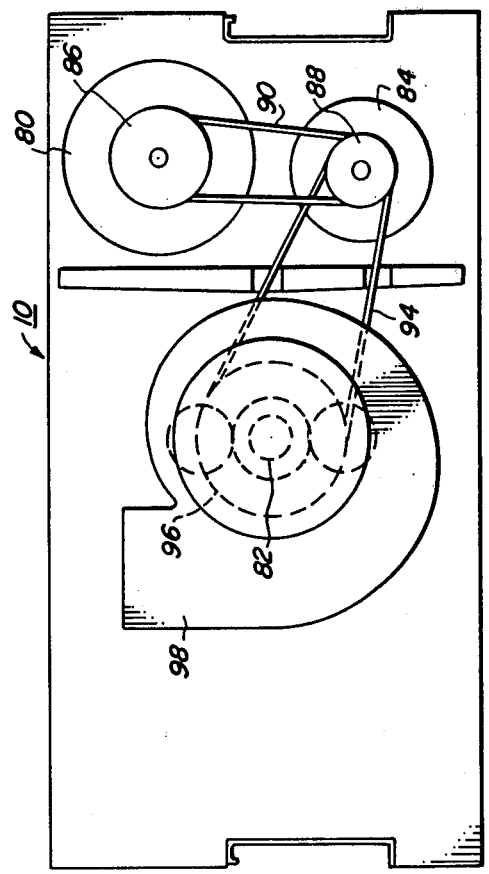
FIG. 4 is an end elevation view of the disk drive of FIG. 2 with certain components of the drive deleted for clarity of others.

Referring now particularly to FIGS. 2 - 4, a motor 80 is included for rotating a drive shaft 82 forming part of the linear actuator 12 and for rotating the drive shaft of an alternator 84. As will be described in more detail below in connection with FIG. 10, the motor 80 and alternator 84 together form part of an improved power supply for the disk drive 10. The motor 80 and alternator 84 each have a pulley 86 and 88, respectively, connected to their drive shafts. A drive belt 90 is stretched about and between the pulleys 86 and 88 so that energization of the motor 80 will cause a corresponding energization of the alternator 84. A second pulley 92 (FIG. 3) is connected to the drive shaft of the alternator 84 and it is coupled by means of a drive belt 94 to a pulley 96 connected to the drive shaft 82 of the linear actuator 12. Thus, energization of the motor 80 and thus alternator 84 will cause a corresponding rotation of the drive shaft 82. If desired, pulley 92 and belt 94 could be deleted with pulley 96 reoriented and driven along with pulley 86 and 88 by a single drive belt (not shown). Also connected to the drive shaft 82 of the linear actuator 12, and thus driven by energization of the motor 80, is a fan 98. As is conventional, the fan serves to cool the disk drive 10 during operation by convective cooling. Appropriate ducts (not shown) are included in the overall configuration of the disk drive to assist in such convective cooling.

As shown in FIG. 2, the various electrical and electronic circuits for the disk drive 10 are preferably constituted on a plurality of printed circuit (PC) boards 100 removably mounted to a platform (not shown) suitably connected to the support frame 20. These circuits include the servo control circuits for controlling operation of the linear actuator 12 in order to control the positioning of the heads 14a - 14h, the rectifier, filter and voltage regulator circuits forming part of the power supply 18 to be discussed below in connection with FIG. 10, and the interface circuits for enabling the disk drive to communicate with a suitable host controller (not shown).

Figure 5:
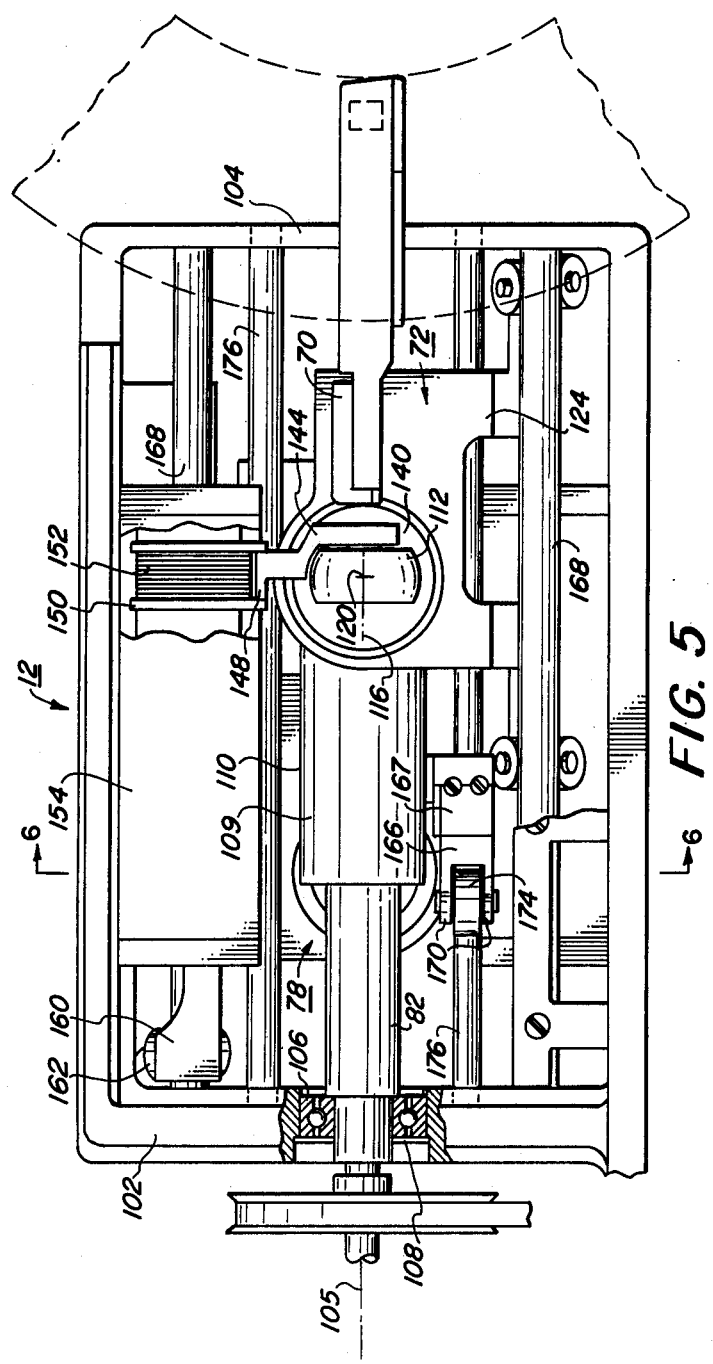
FIG. 5 is a magnified and more detailed top elevation view, partly broken away, of the linear actuator shown in FIG. 2.
Figure 6:
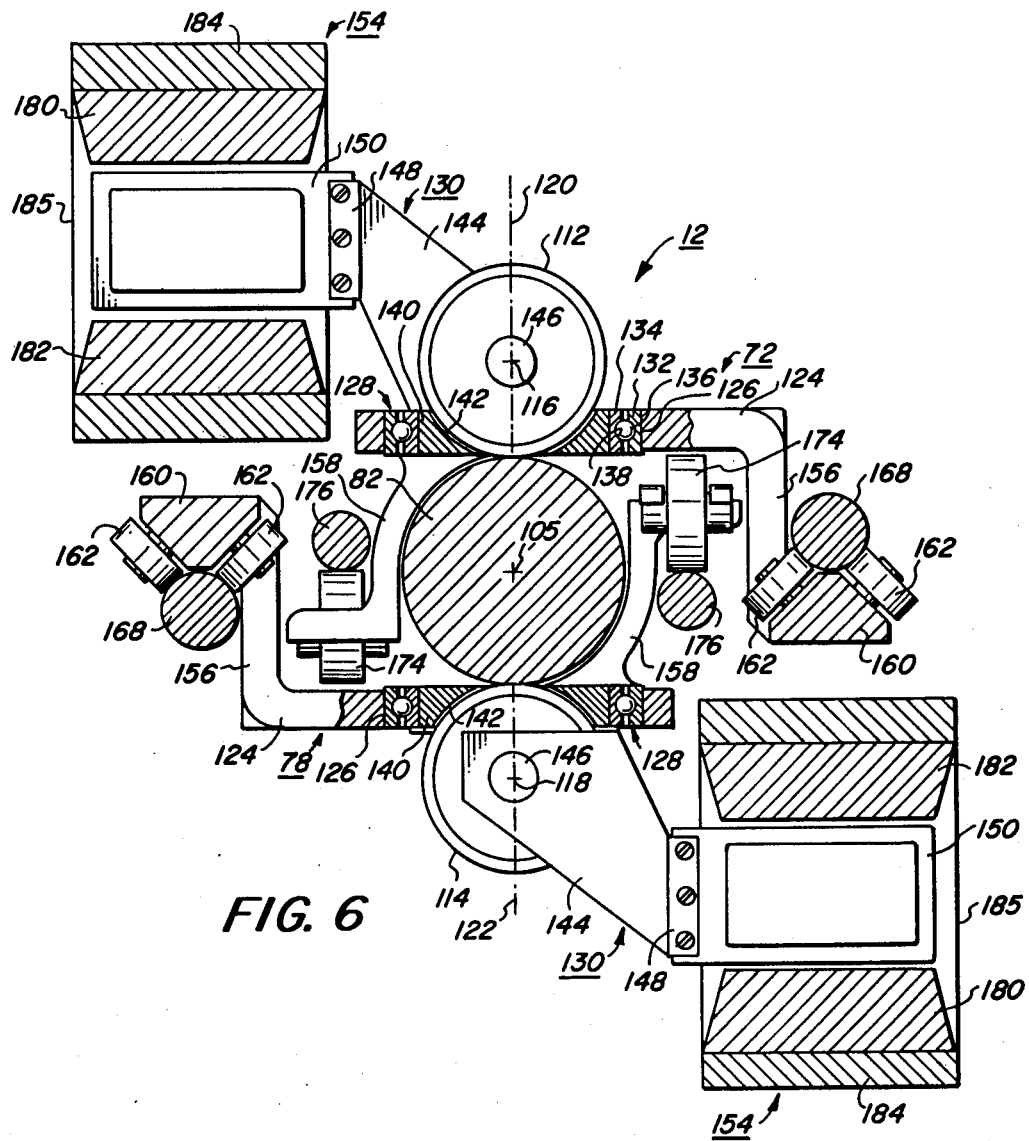
FIG. 6 is a cross-sectional view of the linear actuator of FIG. 5 taken along lines 6 — 6 of FIG. 5.
Figure 7:
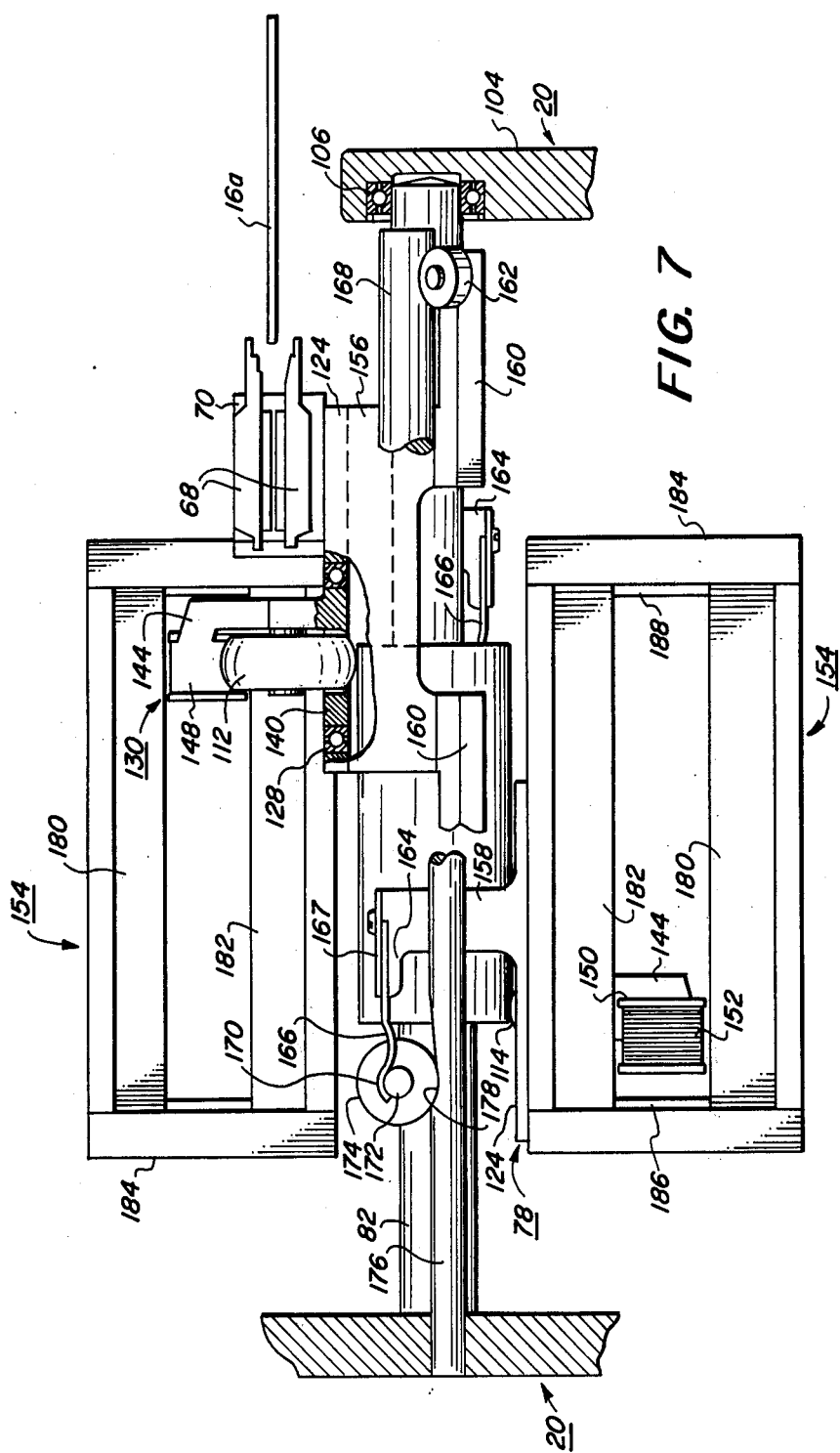
FIG. 7 is a side elevation view, partly broken away, of the linear actuator of FIGS. 5 and 6.

Reference is now had to FIGS. 5 - 7 for a more detailed description of the improved linear actuator 12. In general terms, the linear actuator 12 is adapted to move each of the carriages 72 and 78 relative to the support frame 20 along a linear path parallel to the axis of rotation of the drive shaft 82. The drive shaft 82 is rotatably mounted to the support frame with its axis of rotation 105 parallel to a desired direction of linear movement for the heads 14a - 14h. More specifically, the support frame 20 has two walls 102 and 104 which are parallel to one another and a perpendicular to such desired direction. The walls 102 and 104 have circular openings formed therein with aligned centers. The opening in wall 102 passes completely through the wall, unlike the opening in wall 104. A pair of bearing members 106 are mounted in the openings for receipt of the drive shaft 82 with the axis 105 of the drive shaft intersecting the centers of the openings. The bearing members 106 may be of any suitable type capable of enabling the free rotation of the drive shaft about its axis while restraining movement of the drive shaft in directions perpendicular to such axis. A spring member (not shown) and a snap ring 108 are respectively mounted in the openings in walls 104 and 102 for preventing axial movement of the drive shaft 82 during linear movement of one or both carriages. Specifically, the spring member is disposed between the bearing 106 in wall 104 and such wall and biases the inner ring of the bearing, and thus the drive shaft 82 against the snap ring 108 with a sufficient level of force to prevent such axial movement. For a more complete understanding of this relationship, reference is had to the aforementioned copending applications.

The drive shaft 82 includes an intermediate portion 109 having an outer cylindrical surface 110 which is adapted to be forceably and frictionally engaged by a pair of follower rollers 112 and 114. These rollers are respectively mounted to the carriages 72 and 78 in a manner whereby each roller is rotatable about its axis and pivotable about a second axis perpendicular to its axis. For purposes of future explanation, the axis of rotation of each roller 112 and 114 shall be referred to as its "first axis". Each carriage 72 and 78 is mounted to the support frame 20 with the carriage being movable relative to the support frame along a path parallel to the axis 105 of the drive shaft 82 and with the follower roller 112 and 114 mounted thereto being in frictional engagement with the cylindrical surface 110 of the drive shaft 82 whereby such roller is caused to rotate about its first axis by rotation of the drive shaft 82.

Referring specifically to FIG. 6, the first axes of the rollers 112 and 114 are respectively defined by their longitudinal axes 116 and 118, whereas the second axes of the rollers are respectively defined by axes 120 and 122 which are respectively perpendicular to axis 116 and 118 and which respectively intersect the centers of the rollers 112 and 114. Thus, with these rollers having their first axes 116 and 118 parallel to the axis 105 of the drive shaft 82, as shown in FIG. 6, the rollers will be caused to rotate about such axes in the opposite direction to the rotation of the drive shaft 82. In addition, if a roller is pivoted about its second axis so that its first axis becomes oblique to the axis 105 of the drive shaft 82, the roller will, in addition to being rotated about its first axis by rotation of the drive shaft 82, be moved linearly in a direction parallel to the axis of the drive shaft. Looking at FIG. 5, if the roller 112 is pivoted clockwise, for example, from the position shown so that its axis 116 is oblique to the axis 105 of the drive shaft, a counter clockwise rotation of the drive shaft (see FIG. 6) would result in movement of the roller toward the left. This relationship is more completely described in the aforementioned copending U.S. applications Ser. Nos. 486,408 and 579,432.

Before describing in detail a preferred means for mounting each follower roller 112 and 114 to its associated carriage 72 and 78, it must be noted that each carriage and associated follower roller, together with the associated means for mounting the roller to the carriage and all other elements and components coupled to and carried by the carriage as it moves along its linear path, constitute a head-carriage assembly. In accordance with one improvement of the linear acutator 12 to be described in more detail below, each head-carriage assembly is so arranged and mounted such that its center of mass lies along a line parallel to the axis of the drive shaft and substantially intersecting or at least closely adjacent the center of force acting upon the carriage to move it and the assembly along a linear path parallel to the axis 105 of the drive shaft. The center of force is defined substantially at the nip between the follower roller and the cylindrical surface 110 of the drive shaft. With the center of mass lying along a line substantially intersecting or at least closely adjacent the center of force, such force will pass substantially through or at least closely adjacent the center of mass thereby substantially reducing tipping movements. The presence of tipping movements oftentimes results in unwanted vibrations which can adversely affect positioning control of the assembly.

As best shown in FIG. 6, each carriage 72 and 78 has a substantially flat platform portion 124, each of which includes a circular opening 126 formed therein. The means for mounting each follower roller 112 and 114 to its respective carriage then includes a bearing 128 mounted to the carriage within the respective opening opening 126, and a support member 130 connected to the follower roller for enabling the rotation of the roller about its first axis. As will be discussed in more detail below, each support member 130 includes a portion 140 mounted in the respective opening 126 against the bearing 128 in order that the respective follower roller may be pivoted about its second axis. p In accordance with another improvement of the linear actuator 12, the bearing 128 is preferably of the "torque tube type." As used herein, the term "torque tube type" shall be deemed to refer to the class of bearings which are characterized by two concentric rings 132 and 134 spaced apart a distance substantially less than the radius of the inner ring, and a plurality of ball bearings 136 disposed between and in rolling contact with an annular groove 138 formed in each of the rings. These bearings are also sometimes referred to as "thin-walled" bearings due to the ratio of the distance between the rings relative to the radius of the inner ring. The thin-walled nature of these bearings greatly stiffens, with minimum weight and moment of inertia, the respective head-carriage assembly in relation to the ability of the respective follower roller and its support member 130 to move relative to the carriage. Such stiffening reduces the chances of unwanted vibrations which might adversely affect positioning control.

Still referring to FIGS. 5 – 7, each support member 130 includes a circular platform portion 140 which is fitted in the opening 126 in the respective carriage platform portion 124 against the inner ring 134 of the respective bearing 128. The platform portion 140 is then rotatable about its axis relative to the outer ring 132 of the bearing 128 and thus the respective carriage 72 or 78 in which such bearing is mounted. Each platform portion 140 has an opening 142 formed therein through which a respective follower roller is disposed in order to contact the cylindrical surface 110 of the drive shaft 82 when the platform portion 124 is mounted closely adjacent such cylindrical surface in a manner to be described below.

Each support member 130 further includes an arm 144 integral with and projecting from the platform portion 140 thereof. Bolted to each arm 144 is a shaft 146 about which a respective one of the follower rollers 112 and 114 is rotatable. In this respect, the follower rollers 112 and 114 are each preferably of a type having a built-in bearing suitable to allow rotation of the roller about the respective shaft 146 and sufficient to constrain any other movement of the roller relative to such shaft, e.g. along the axis of the shaft 146. Each shaft 146 is bolted to its respective arm 144 at a location such that the respective follower roller will be received in the opening 142 in the platform portion 140 and will project through the opposite side of the respective platform portion 124.

Each arm 144 has a vertically oriented plate 148 at the outer end thereof. Each plate 148 has mounted thereto a bobbin 150 about which is wound a coil 152. Each coil 152 forms part of a magnetic assembly 154 which will be described in more detail below. At this point, however, it should be noted that when current is made to flow in one direction through the coil 152, it will cause the respective support member 130 to rotate within the opening 126 about its axis thereby causing the respective follower roller 112 and 114 to pivot about its second axis 120 or 122, respectively. In this regard, it will be noted that the axis of rotation of each platform portion 140 is coincident with and defines the second axis of the respective follower roller.

Still referring to FIGS. 5 – 7, the means for mounting each carriage 72 and 78 to the support frame 20 will now be described. As alluded to above, the mounting is such that the carriage, and thus entire head-carriage assembly, is movable along a linear path parallel to the axis 105 of the drive shaft 82, and the respective follower roller 112 or 114 is in frictional and forceable engagement with the cylindrical surface 110 of the drive shaft whereby the roller is caused to rotate about its first axis 116 or 118, respectively, by rotation of the drive shaft 82 when such first axis is parallel to the axis 105 of the drive shaft 82 and is additionally caused to move along such linear path during rotation of the drive shaft when such first axis is oblique to the axis 105. It should be apparent that the greater the angle between the first axis of the follower roller and the axis 105, the faster the linear movement of the respective head-carriage assembly. Also, the faster the follower roller is pivoted about its second axis, the greater the acceleration or deceleration of the head-carriage assembly, as the case may be.

The means for mounting each carriage 72 and 78 to the support frame 20 is identical and so like reference numbers will be used for identical parts. Each carriage 72 and 78 includes first and second flange portions 156 and 158 integral with the respective platform portion 124 and extending in a direction away from the respective follower roller 112 or 114 mounted thereto. Each flange portion 156 includes a pair of support bars 160 mounted at either end thereof. Each bar 160 is preferably generally triangular in cross-section, as best shown in FIG. 6, and has a pair of guide rollers 162 rotatably mounted to the sloped sides thereof. There are thus four guide rollers 162 mounted to each carriage 72 and 78 and forming a part of the overall head-carriage assembly including such carriage. The guide rollers 162 of each head-carriage assembly are adapted to frictionally and forceably engage a guide rail 168 fixedly mounted by suitable means to the side walls 102 and 104 of the support frame 20 with the axis of the rail 168 being parallel to the axis 105 of the drive shaft 82.

As best shown in FIG. 7, each flange portion 158 terminates in a generally horizontal support pad 164 having a leaf spring 166 mounted to the underside thereof by a mounting plate 167. Each leaf spring 166 extends outwardly from its support pad 164 in a direction opposite the location of the disks 16a - 16d, i.e. toward the back wall 102 of the support frame 20. The spring has a pair of angled flange portions 170 adapted to engage the shaft 172 of a load roller 174 included in each head-carriage assembly. In this respect, the shaft 172 extends from either side of the roller 174.

Each spring 166 is adapted to forceably bias its respective load roller 174 against a load rail 176. There are thus two load rails 176, one associated with each carriage 72 and 78 and thus with each head-carriage assembly. Each load rail 176 is fixedly mounted by suitable means to the side walls 102 and 104 of the support frame 20 and extends in a direction parallel to the axes of the drive shaft 82 and the guide rail 168. Preferably, the rails 168 and 176 each extends a distance substantially coextensive with the drive shaft 82 as mounted between the frame walls 102 and 104.

As best shown in FIG. 6, each carriage 72 and 78 is physically mounted to the support frame 20 by positioning the carriage such that the rollers 162 engage the guide rail 168. The platform portion 124 of the carriage is then lowered until the associated follower roller 112 or 114 mounted thereto engages the cylindrical surface 110 of the drive shaft 82. The platform portion 124 will be substantially horizontal due to the relationship of the position and diameter of the cylindrical surface 110 relative to the position and diameter of the guide rail 168. During this initial mounting operation, the respective load roller 174 will not have been introduced.

Now then, the flange portions 170 of the associated leaf spring 166 are manually deflected away from the load rail 176 thereby allowing the load roller 174 to be positioned between the spring 166 and the load rail and retained in place by the flange portions 170 engaging the shaft 172 of the load roller 174. The diameter and position of each load rail 176 is very carefully determined in relation to the diameter of the load roller 174 and the characteristics of the spring in order for the spring to exert a sufficient biasing force engaging the load roller 174 against the load rail 176 to establish a resultant opposing force biasing the carriage in the direction of the drive shaft 82 and thereby engaging the respective follower roller 112 or 114 against the cylindrical surface 110 of the drive shaft 82 with such force. This force is pre-established at a level sufficient to prevent slippage of the follower roller relative to the cylindrical surface 110 during controlled reciprocal linear movement of the carriage along a path parallel to the axis of the drive shaft 82.

In accordance with another improvement of the linear actuator 12, a means is provided for reducing the force biasing each follower roller 112 and 114 against the cylindrical surface 110 of the drive shaft 82 whenever the respective carriage is at an "inactive" position relative to one or more "active" positions. In the context of a disk drive, such as the disk drive 10, the "inactive" position of each carriage may be defined when the electromagnetic heads carried thereby are retracted relative to their respective disk or disks and the "active" positions are each defined when the heads are positioned above a desired track on the respective disk surfaces.

In accordance with the preferred embodiment, the drive shaft 82 is continuously rotated regardless of whether or not a particular carriage or both carriages may be at an "inactive" position, i.e. with heads retracted. Rotation is desirably continuous in order to keep the alternator 84 and for 98 operating continuously.

Referring to FIG. 7, the means for reducing the biasing force holding each follower roller 112 and 114 against the cylindrical surface 110 of the drive shaft 82 includes a ramp 178 formed in the peripheral surface of each load rail 176 at a location to be engaged by the respective load roller 174 when the respective carriage is at its "inactive", or head retracted position. Such "inactive" position is shown for the lower head-carriage assembly i.e. that including the carriage 78, in FIG. 7. Each ramp 178 is formed into the load rail 176 in a manner such that when the associated load roller 174 is engaged therewith, the roller 74 will be allowed to move closer to the axis of the load rail 176, thereby reducing the biasing force of the associated spring 166. Thus, of course, will then reduce the force engaging the roller 174 against the load rail 176 and thus the force engaging the respective follower roller 112 or 114 against the cylindrical surface 110 of the drive shaft. Each ramp 178 is preferably tapered so that the biasing force will be increased gradually when the respective carriage is moved from its inactive to one of its active (heads loaded) position.

The primary purpose of reducing the biasing force during periods when the heads are retracted is to prolong the life of the respective follower roller 112 or 114 and the cylindrical surface 110 of the drive shaft 82, since the drive shaft and follower rollers are continuously rotating even when the heads on a particular carriage are retracted. However, it should be clear that such reduction in biasing force will also reduce the load on the bearings of rollers 112 and 114 and the drive shaft bearings 106, thereby prolonging their life and increasing overall reliability. By reason of the reduction in biasing force during head retracted periods, it is possible to fabricate each follower roller and/or cylindrical surface of the drive shaft of a slightly less expensive material than would be normally employed if the biasing force was always constant whether the heads were retracted or not. The specific materials selected for the follower rollers 112 and 114 and the cylindrical surface 110 constitute yet another improvement of the linear actuator 12 and will be described in more detail below.

Before discussing this latter improvement, as well as all other improvements of the linear actuator 12, the magnetic assemblies 154 will be discussed with reference to FIGS. 5 – 7. It will be recalled that each assembly 154 constitutes part of a means for selectively and controllably pivoting the respective follower roller 112 or 114 about its second axis 120 or 122, respectively, during the rotation of the drive shaft 82 in order to control the movement of the follower roller and thus the respective carriage and head-carriage assembly along a linear path parallel to the axis 105 of the drive shaft 82.

Each magnetic assembly includes a pair of elongate permanent magnets 180 and 182 which are mounted to a housing 184 in spaced apart relation. Positioned in the space between the magnets 180 and 182 is the associated coil wound bobbin 150. The bobbin 150 is capable of traversing the elongate space between the magnets during linear movement of the respective carriage and is also capable of movement along an arcuate path relative to the second axis 120 or 122 of the associated follower roller 112 or 114, respectively, in order to pivot the roller about such axis. In this respect, the clearance between each bobbin 150 and the adjacent side wall 185 of the housing 184 is made large enough to allow such arcuate movement unobstructed. The magnetic field established between the magnets 180 and 182 is such that the bobbin will move in one direction along the above referenced arcurate path during energization of the coil in one direction and will move in the opposite direction upon energization of the coil in the other direction. In this manner, the direction of linear movement of each head-carriage assembly can be controlled. The specific manner in which current is applied to the coils 152 will be discussed in more detail below in connection with FIG. 9.

Further included in each magnetic assembly 154 are a pair of limit stops 186 and 188 (FIG. 7). The stop 186 is mounted to the housing 184 between the magnets adjacent the rearward end of the path of travel of the bobbin 150, i.e. at that portion of such path of travel furthest from the location of the disks 16a – 16d in the disk drive 10. Correspondingly, the stop 188 is mounted to the housing 184 between the magnets adjacent the forward end of the bobbin's path of travel. The stops 186 and 188, of course, act to define rearward and forward limits to the path of travel of the bobbin 150 and thus the respective head-carriage assembly during energization of the coil 152 wound on such bobbin. Appropriate emergency stops (not shown) may be provided at appropriate locations in the disk drive in the event the control current to the coil 152 ceases during the movement of the respective head-carriage assembly.

Certain improvements included in the linear actuator 12 have already been discussed. However, it would be helpful to include, at this point, a discussion of each of the improvements, including a brief review of each mentioned to date. The primary aims of the improvements considered as a whole are to reduce any "looseness" that may exist in the linear actuator 12 which might result in positioning errors, as well as to prolong the life of the follower rollers 112 and 114 and the cylindrical surface of the drive shaft 82 and to reduce the chances of the wear that is experienced thereby resulting in positioning errors.

As used herein, the term "looseness" refers to the ability of each head-carriage assembly to move relative to its direction of lineal movement during such lineal movement, as well as the ability of various components of the assembly to move relative to one another or relative to the assembly as a whole during lineal movement of the assembly. There are a numbers of ways to reduce looseness. For one, the drive shaft 82 should be rotatably mounted to the support frame 20 in a manner whereby it is restrained from all movements, except rotation about its axis 105. As another, each follower roller 112 and 114 should be restrained from all movements relative to the respective carriage 72 or 78 to which it is mounted, except rotation about its first axis 116 or 118, respectively, and pivoting about its second axis 120 or 122, respectively.

In accordance with the linear actuator 12, suitable bearings members 106, spring member 107 and retaining ring 108 are employed to restrain unwanted movements of the drive shaft 82. Similarly, the arrangement of using an internal bearing (not shown) in each follower roller 112 and 114 with the arm 144 of the associated support member 130 being bolted to the shaft 146 of the roller restrains any unwanted movements of the roller relative to such support member. The most difficult area to reduce looseness is with respect to unwanted movement of each follower roller relative to its respective carriage. This is especially difficult in the present arrangement where each follower roller is disposed through the opening 126 in the platform portion 124 of the associated carriage 72 or 78.

In one improvement of the linear actuator 12, therefore, a bearing 128 of the "torque tube" or "thinned walled" type is employed to rotatably mount the platform portion 140 of each support member 130 within the opening 126 of the associated carriage platform portion 124, as discussed above. Also as discussed above, this greatly stiffens, with minimum weight and movement of inertia, the head-carriage assembly by substantially reducing the likelihood of unwanted movements of each follower roller relative to its carriage. Such stiffening reduces the likelihood of unwanted vibrations occuring which might adversely affect positioning control.

In accordance with another improvement of the linear actuator 12, the configuration, orientation and mounting of each head-carriage assembly to the support frame 20 is such that the center of mass of the head-carriage assembly, which includes all components mounted or coupled to and movable with the associated carriage 72 or 78, lies along a line parallel to the axis of the drive shaft and substantially intersecting or at least closely adjacent the center of force acting upon the head-carriage assembly to move it along its linear path parallel to the axis 105 of the drive shaft 82. This center of force will be substantially at the nip between the respective follower roller 112 or 114 and the cylindrical surface 110 of the drive shaft 82. In view of the above, the force acting to move each head-carriage assembly will pass substantially through or at least closely adjacent its center of mass, thereby substantially reducing tipping moments and their resultant vibrations, and thereby reducing the chances of positioning errors. Vibrations may be especially undesirable if the servo control system used to control energization of the coils 152 and thus linear movement of the head-carriage assemblies is of a closed loop type, for example having a "track-following" capability. Should the resonant frequency of any vibrations be within the servo bandwidth, track following errors may occur.

The desired location of the center of mass relative to the center of force, as above-described, is the result of a number of factors in the improved linear actuator 12. First, the main platform portion 124 of each carriage 72 and 78 is positioned very closely adjacent the cylindrical surface of the drive shaft 82. This is made possible by mounting the respective follower roller 112 or 114 to the platform portion 124 with the peripheral surface thereof projecting through the opening 126 in order to contact the cylindrical surface 110. Desirably, the distance from the nip between each follower roller 112 and 114 and the cylindrical surface 110 to that surface of the respective platform portion 124 located furthest from such nip is less than the radius of the follower roller. In this manner, each platform portion 124 will be located between the nip and the first axis of the respective follower roller.

As a second factor, the means for biasing each follower roller 112 and 114 against the cylindrical surface 110 is located on the drive shaft 82 side of the nip between the follower roller and the cylindrical surface. It will be recalled that this biasing means includes the flange portion 158, support pad 164, leaf spring 166, load roller 174 and load rail 176. All but the load rail 176 are part of the respective moving mass assembly, i.e. head-carriage assembly.

As a third factor, the guiding means for each head-carriage assembly, which includes not only the biasing means as the above described, but also the flange portion 156, bars 160, guide rollers 162 and guide rail 168, is located on the drive shaft 82 side of the nip between the respective follower roller and the cylindrical surface 110. All but the guide rail 168 in this latter group are part of the respective head-carriage assembly.

The combination of the above-three factors essentially compensates for the mass of each head-carriage assembly located on the follower roller side of the nip. This mass includes the respective electromagnetic heads and their mountings, the respective follower roller itself and its mounting means, as well as the platform portion 124 of the respective carriage 72 or 78. In other words, each head-carriage assembly is configured and mounted such that the total mass thereof located on the follower roller side of the nip is substantially counter-balanced by the total mass thereof located on the drive shaft side of the nip so that the center of mass of the entire assembly will lie along a line parallel to the axis of the drive shaft and substantially intersecting the nip. In this manner, the force acting upon the head-carriage assembly to move it linearly will pass substantially through the center of mass. In actuality, it may be difficult to define the center of mass along a line parallel to the axis 105 of the drive shaft and precisely intersecting the nip. In accordance with the subject improvement of the linear actuator 12, therefore, the center of mass is located along a line parallel to the axis 105 which substantially intersects or is at closely adjacent the nip.

Due to the precision and speed required in positioning each head-carriage assembly, it is desirable that the associated follower roller 112 or 114 be pivotable about its second axis 120 or 122, respectively, with a minimal amount of torque. Not only will this facilitate positioning in terms of the speed and accuracy requirements, but it will also minimize the power necessary to supply such torque. In accordance with another improvement of the linear actuator 12, therefore, the shape of the peripheral surface of each follower roller is optimized in the sense that the torque required to pivot the follower roller about its second axis is made as small as possible consistent with an acceptable level of stress on the follower roller and cylindrical surface 110 of the drive shaft 82 for the particular materials thereof and force of engagement therebetween.

The amount of torque required to pivot each follower roller 112 and 114 about its second axis 120 and 122, respectively, is directly related to the frictional resistance to pivoting such roller as engaged with the cylindrical surface 110 of the drive shaft 82. Such frictional resistance to pivoting is, in turn, a function of the force holding the follower roller in frictional engagement with the cylindrical surface 110, the materials of the follower roller and cylindrical surface, and the contact area between the follower roller and cylindrical surface. By "contact area" it is meant that portion of the peripheral surface of the follower roller and the cylindrical surface of the drive shaft 82 which are in mutual engagement at any instant of time.

Although the torque required to pivot each follower roller 112 and 114 about its respective second axis 120 and 122 decreases as the contact area is reduced, the stress on the peripheral surface of the roller and cylindrical surface of the drive shaft at such contact area will be increased. In accordance with the subject improvement, therefore, the contact area is optimized or made as small as possible consistent with an acceptable level of stress in order to have the torque required for pivoting as small as possible consistent with such level of stress.

Referring to FIGS. 5 and 7, the peripheral surface of each follower roller 112 and 114 is formed of convex cross-sectional configuration wherein the cross-section is defined along a plane including the first axis of the follower roller therein. Any suitable convex shape may be utilized consistent with the particular materials of the follower roller and cylindrical surface 110 in order for the "contact area" to be kept to an acceptable minimum, as above defined. Desirably, the peripheral surface of each follower roller is circularly convex in cross-section wherein the radius of curvature is optimized in the sense that the requisite pivoting torque is as low as possible consistent with an acceptable level of stress on the follower roller and cylindrical surface 110.

Figure 8:
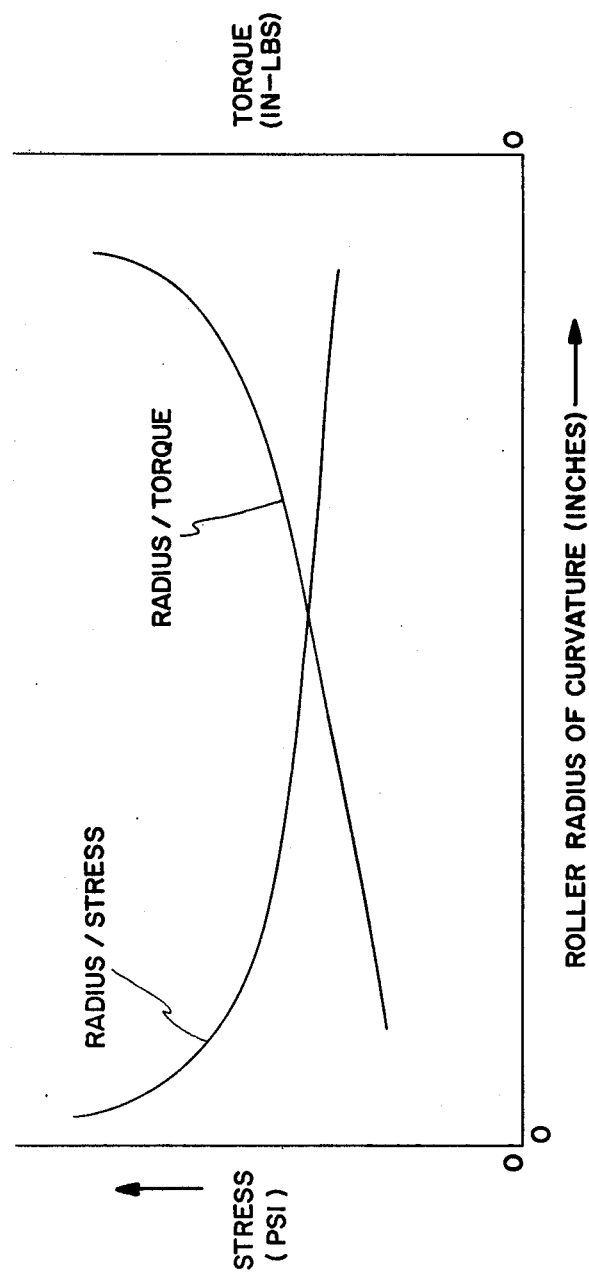
FIG. 8 is a graphical representation of the torque required to pivot each follower roller as a function of the radius of curvature of its peripheral contacting surface, as well as the stress on the follower roller as a function of such radius of curvature.

Reference is now had to FIG. 8 which is a general graphical representation of the torque required to pivot each follower roller as a function of the radius of curvature of its peripheral contacting surface, as well as the stress on the follower roller as a function of such radius of curvature. Obviously, the particular materials and force of engagement will dictate what the optimum radius of curvature will be in terms of required pivoting torque and stress. In practice, this is a trial and error technique. It might well be that a range of so-called "optimized" radii of curvature will be arrived at.

When using a drive shaft 82 having its cylindrical surface 110 fabricated of tungsten carbide with an outer diameter of about 1.5 inches, and follower rollers 112 and 114 each fabricated of a hardened, corosion resistant tool steel having an outer peripheral radius of about 0.6 inches, with a force of between about 40 and 50 pounds engaging each follower roller against the cylindrical surface 110, it has been found that the desired cross-sectioned shape of each follower roller is circularly convex with a radius of curvature of about between 4.0 and 8.0 inches.

Obviously, the above is only exemplary, as the specific convex shape of each follower roller will be determined on a trial and error basis following selection of appropriate materials for the follower rollers and cylindrical surface 110, as well as an appropriate force or range of forces for engaging each follower roller against the cylindrical surface 110. Thus, it may well be that a circularly convex cross-section might not always be best suited and some other convex configuration might be found more desirable. In any event, the subject improvement resides in the recognition that a shape different than lineal in cross-section should be defined for the peripheral surface of each follower roller in order to reduce the "contact area", as above defined.

In accordance with yet another improvement of the linear actuator 12, the materials of the follower rollers 112 and 114 and cylindrical surface 110 are selected such that the peripheral surface of each follower roller is less hard than the cylindrical surface 110. With this relationship, any wear that occurs due to continuous driving frictional contact between each follower roller and the cylindrical surface 110 will be borne primarily and, if the materials are optimumly selected in view of the engaging force, substantially entirely by the peripheral surfaces of the follower rollers. Additionally, the specific material of each follower roller peripheral surface is selected such that the normal wear thereof will be substantially uniform. In this manner, the possibility of positioning errors occuring as a result of grooves being formed in the cylindrical surface 110 due to uneven wear thereof is substantially reduced, as is the possibility of unwanted vibrations occuring as a result of an unevenly worn roller peripheral surface or drive shaft cylindrical surface.

In accordance with one exemplary embodiment, and as alluded to above, the peripheral surface of each follower roller 112 and 114 is fabricated of a hardened, corosion resistant tool steel, preferably having a "Rockwell C" hardness of between about 63 and 65, and the cylindrical surface 110 of the drive shaft is fabricated of tungsten carbide having a Rockwell C hardness of between about 80 and 85. As an alternative, the material of the cylindrical surface 110 may be titanium carbide having a Rockwell C hardness of between about 77 and 82. It will be noted that, in both cases, the material of the peripheral surfaces of the follower rollers 112 and 114 is less hard than that of the cylindrical surface 110. It will be further be noted that no external lubrication means is required in either alternative, which is desirable in view of the maintenance requirements of such a lubrication means and the possibility of the lubricant adversely affecting the ability of the heads 14a – 14h to "fly" above their respective disk surfaces.

In accordance with another exemplary embodiment, each follower roller 112 and 114 may be fabricated of a thermo-set type plastic or a plastic reinforced with strengthening fibers, such as boron fibers. A plastic of the first category that has been tested with success thus far is generally known as polymide plastic. In this embodiment, the cylindrical surface 110 of the drive shaft 82 is fabricated of a hardened, corrosion resistant tool steel having a Rockwell C hardness of between about 63 and 65. This is to be compared with a Rockwell E hardness of polymide plastic of about 45 which is approximately equivalent to a Rockwell C hardness of about 4.5.

The use of plastic follower rollers has the advantage of being considerably lower in cost than tool steel. On the other hand, the plastic might tend to flaten out during periods of non-use, i.e. when not being driven by rotation of the drive shaft 82. This can be compensated for, however, by providing the ramp 178 in each load rail 176 to reduce the force loading each follower roller 112 and 114 against the cylindrical surface 110 during periods of head retraction which would, of course, include periods of non-use since the heads are retracted during non-use. The use of ramps 178 therefore constitutes yet another improvement of the linear actuator 12, as explained in more detail above.

Figure 9:
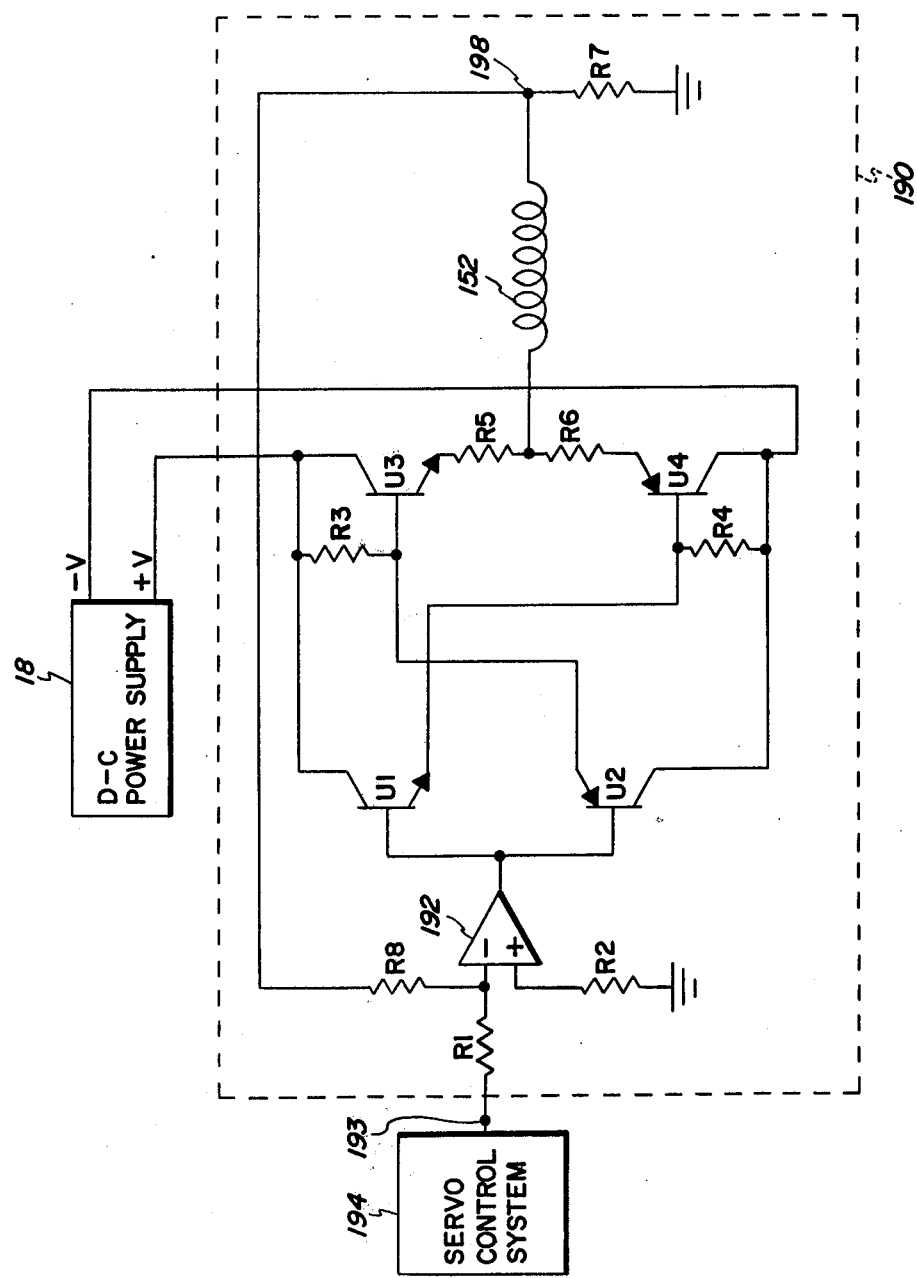
FIG. 9 is a schematic diagram of an exemplary coil driver circuit for controlling the energization of the coil in each of the magnetic assemblies depicted in FIG. 6.

Reference is now had to FIG. 9 wherein an exemplary driver circuit 190 for energizing the coil 152 in each magnetic assembly 154 is shown. The driver circuit includes an operational amplifier 192 having its negative input coupled through a resistor R1 to the control output terminal 193 of a servo control system 194 and its positive input coupled to ground through a resistor R2. The servo control system may be of any suitable type. For example, it may be a first order system wherein the control signal output is representative of the distance to be traveled by the heads of the respective head-carriage assembly between actual and desired positions. Alternatively, it may be a second order system wherein the control signal output is representative not only of the distance to be traveled, but also of a desired velocity of travel for such distance. As another alternative, a third order system may be employed wherein the control signal output is representative of the distance to be traveled, as well as the desired velocity and the desired acceleration or deceleration for such distance.

The servo control system 194 may be designed merely to position the heads of each assembly over a desired track by positioning the heads at the radius of the disk corresponding to such track. Alternatively, and desirably, the servo control system has a track following capability so that the heads may be made to follow the "run-out" or eccentricity of each track. In a track following servo, therefore, the control signal output at the terminal 193 will vary after the heads have been initially positioned over the track in order to follow the run-out thereof.

As the specific servo control system selected for use does not form part of the present invention, it will not be described in detail herein. However, it must again be pointed out that any suitable servo control system may be employed.

Referring again to FIG. 9, the output of the amplifier 192 is coupled to the base electrode of an NPN transistor U1 and to the base electrode of a PNP transistor U2. The collector electrode of the transistor U1 is coupled to a source of positive d-c voltage (+V) as supplied by an improved d-c power supply 18. Voltage +V is also supplied to the collector electrode of another NPN transistor U3. The power supply also generates a negative d-c voltage (−V) which is coupled to the collector electrode of the transistor U2 and to the collector electrode of another PNP transistor U4.

The emitter electrode of the transistor U1 is coupled to the base electrode of the transistor U4 and the emitter electrode of the transistor U2 is coupled to the base electrode of the transistor U3. Additionally, a resistor R3 is coupled between the base and collector electrodes of the transistor U3 and a resistor R4 is coupled between the base and collector electrodes of the transistor U4.

The emitter electrodes of the transistors U3 and U4 are coupled together through a pair of resistors R5 and R6. The coil 152 is then coupled at one end to the junction of the resistors R5 and R6 and at the other end to a terminal 198 which is coupled to ground through a resistor R7 and is also coupled in feedback relation through a resistor R8 to the negative input of the operational amplifier 192.

In operation, a positive control signal received at the negative input to the amplifier 192 will be inverted and applied to both transistors U1 and U2. The negative signal will cause only the transistor U2 to turn on, thereby turning on transistor U3 and causing a current flow from right to left through the coil 152 as shown in FIG. 9. The current flow will continue to increase until the current flowing through resistor R1 equals that flowing through resistor R8. At this point, the output of the amplifier 192 will go positive, thereby turning off transistors U2 and U3. This point corresponds to the associated follower roller 112 or 114 being pivoted a desired amount in order to attain a desired velocity for the particular distance remaining to be traveled by the associated head-carriage assembly. The current flow through the coil 152 will start to decay thereby resulting in transistors U2 and U3 turning on again after a short period. The resulting pulsing action will continue as the head-carriage assembly is moved toward its desired stopping position, except that the control signal will be progressively reduced in positive amplitude thereby causing the progressively slower movement of the head-carriage assembly. This is continued until the desired stopping position is reached, at which point the control signal will be zero.

When it is desired to move the head-carriage assembly in the opposite direction, a negative control signal will be applied to the negative input of the amplifier 192 resulting in a positive output thereof which turns on transistors U1 and U4 thereby causing a current flow through the coil 152 from left to right as viewed in FIG. 9. This will be continued until the desired pivotal position of the respective follower roller is reached, which corresponds to the current flow through resistor R1 equaling that through resistor R8. The same pulsing operation will then take place as described above until the head-carriage assembly reaches its desired stopping position.

In the case of a track following servo control system, the head-carriage assembly will be constantly altered in lineal position at a frequency corresponding to the runout frequency of the track. In this case, the control signal at terminal 193 will be alternately positive and negative.

It must be pointed out that any suitable coil driver circuit capable of controlling the direction and level of current flow through each coil 152 may be used. The one shown in FIG. 9 is merely exemplary. Further, it must be understood that the resultant magnetic field established in each magnetic assembly 154 by the current flowing in the coil 152 in relation to the permanent magnets 180 and 182 determines the direction of pivotal movement of the respective follower roller; and the pivoting force defined by that resultant magnetic field considered in relation to the torque necessary to pivot the follower roller determines the speed with which the follower roller can be pivoted to a desired pivotal position, such speed directly determining the acceleration of the assembly up to a velocity defined by such desired pivotal position.

Each coil 152 may alternatively be comprised of a pair of coils (not shown) each adapted to conduct current in only one direction. A desirable drive circuit for each pair of coils is disclosed in the aforementioned U.S. patent applications Ser. Nos. 486,408 and 579,432.

Figure 10:
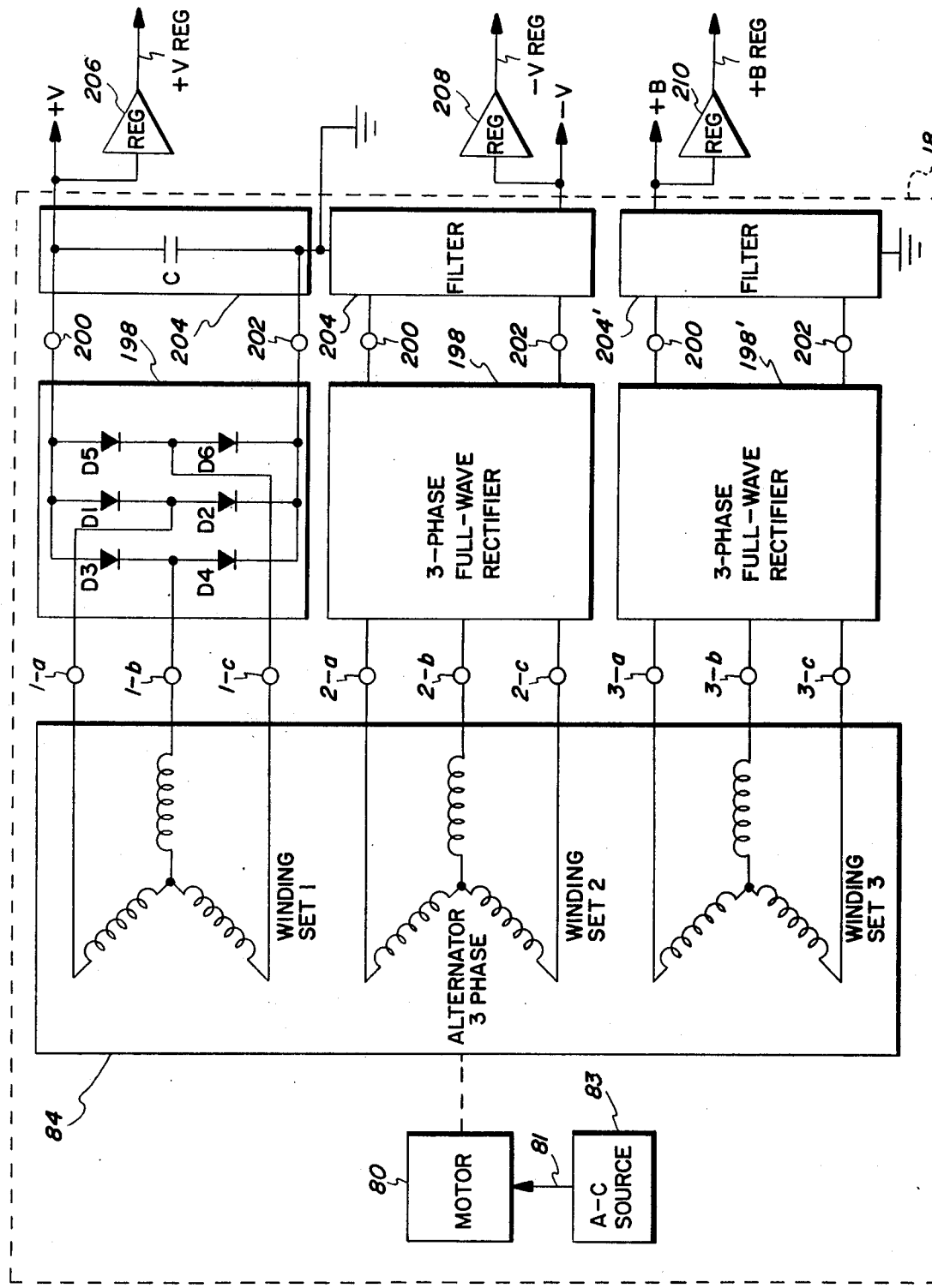
FIG. 10 is a schematic diagram of the improved power supply of the present invention for supplying power to the various electronic circuits in the disk drive of FIGS. 1 – 4.

Reference is now had to FIG. 10 which discloses the improved power supply 18 depicted generally in FIG. 9. As shown in FIG. 10, the power supply includes the driver motor 80 which is driven at a predetermined rate of speed when energized by a suitable a-c voltage as applied along a transmission line 81 from an a-c source 83. As will be recalled, energization of the motor 80 will cause the alternator 84 to be correspondingly driven and the drive shaft 82 correspondingly rotated. The alternator 84 also forms part of the power supply 18 and preferably includes three sets of 3-phase windings, as schematically shown. Alternators of this type are well known in the art.

As shown in FIG. 10, winding set 1 of the alternator 84 is capable of generating an a-c voltage at an output terminal 1-$a$ having a peak amplitude equal to the d-c voltage V plus the voltage drop across either of a pair of matched diodes D1 and D2 included in a 3-phase fullwave rectifier circuit 198. The output terminal 1-2 is coupled to the cathode of diode D1 and the anode of diode D2. The same a-c voltage as developed at the terminal 1-$a$ is also developed at additional output terminals 1-$b$ and 1-$c$, but are mutually phase-displaced from one another by 120°. The terminal 1-$b$ is coupled to the cathode of a diode D3 and the anode of a diode D4, and the terminal 1-$c$ is coupled to the cathode of a diode D5 and the anode of a diode D6. All six diodes D1 – D6 are matched.

As is conventional, the anodes of the diodes D1, D3 and D5 are each coupled to one output terminal 200 of the rectifier 198 and the cathodes of the diodes D2, D4 and D6 are each coupled to another output terminal 202. In this manner, the positive d-c voltage +V is developed at the terminal 200 having a ripple frequency six times that of the frequency of each a-c signal developed at terminals 1-$a$, 1-$b$ and 1-$c$. For example, and preferably, these a-c signals have a frequency of 67 Hz so that the ripple component of +V at the terminal 200 will be at 400 Hz. Similarly, the negative d-c voltage −V is developed at the terminal 202 having the same ripple frequency.

The signals at terminals 200 and 202 are coupled to either side of a filter capacitor C included in a filter 204, wherein the side coupled to terminal 202 is grounded and the output of the filter is taken solely from the terminal 200 side of the capacitor C. The capacitor C, of course, smooths out the ripple component of the d-c voltage +V. In view of the fact that the ripple frequency is so high, the capacitor C may be relatively small, e.g. 100 mf, thereby reducing the cost and size of the power supply. If desired, the developed d-c voltage +V may also be fed through a suitable voltage regulator 206.

In a similar manner to that described above, the negative d-c voltage −V may be developed from the second winding set of the alternator 84. The same a-c voltages are developed at terminals 2-$a$, 2-$b$ and 2-$c$ as terminals 1-$a$, 1-$b$ and 1-$c$, and an identical 3-phase full-wave rectifier 198 is employed which is coupled to an identical filter 204. The only difference is that the output of the filter is taken from the terminal 202 side of the capacitor C, since the terminal 200 side is grounded. The developed d-c voltage −V may also be fed through a suitable voltage regulator 208, if desired.

It will be recalled that the d-c voltages +V and −V are utilized in the coil driver circuit 190 depicted in FIG. 9. Aside from this circuit and other special circuits in the disk drive 10, the main control logic, of which a portion is included in the servo control system 194 (FIG. 9), might require a different, usually lower level d-c voltage, e.g. +B. The power supply 18 is capable of generating this voltage in addition to the voltages +V and −V. This is accomplished by the third winding set of the alternator 84 in a manner similar to that described above for the generation of voltages +V and −V. In this case however, the a-c voltages developed at each of the terminals 3-a, 3-b and 3-c will have a peak amplitude equal to the desired d-c level of voltage +B plus the voltage drop across each diode including in the respective full-wave rectifier 198. It is preferred that the frequency of these a-c voltages be the same as that for the a-c signals developed at the output terminals of the first and second winding sets so that a relatively small filter capacitor may be employed in the respective filter 204'. As before, the developed voltage +B can be regulated by a suitable regulator 210.

It is preferred that the alternator 84 include the three, 3-phase winding sets as above defined to generate the voltages +V, −V and +B, rather than using just one 3-phase winding set to generate +V, for example, which would then have to be inverted to derive −V, and additionally fed through a suitable resistor (not shown) to attenuate the level of +V down to the desired +B. There would obviously be a significant power loss if the latter arrangement were followed.

The power supply 18, as above described, is not limited to use in a disk drive, moreover the specific disk drive 10 having the improved linear actuator 12. Rather, the power supply can be used in any computer peripheral deveice. It is especially desirable for use in computer peripheral devices having an individual need for a motor, such as the motor 80 in the disk drive 10 which is used to drive the drive shaft 82. For very little additional cost, the alternator 84 can be coupled to the shaft of the motor 80 with appropriate rectifier circuits 198 and 198', and filters 204 and 204' being employed to derive three usable d-c voltages, i.e. +V, −V and +B.

The power supply 18 has a number of significant advantages over power supplies commonly used in computer peripheral devices. For one, and as mentioned above, the relatively high ripple frequency requires a relatively small and inexpensive filter capacitor. Second, the power supply is virtually immune to electrical noise and signal transients transmitted over the transmission line 81. This is true since the alternator 84, being mechanically coupled to and driven by the motor 80, is electrically isolated from the a-c voltage operating the motor, as supplied along the line 81. Third, if the a-c voltage source 83 should terminate or be reduced for relatively short periods of time, the inertia of the system will be capable of sustaining usable d-c levels. Fourth, the power supply as a whole is relatively inexpensive and small in size, thereby reducing the cost and size requirements of the computer peripheral device in which it is employed. Fifth, the power supply is substantially more efficient than known power supplies for computer peripheral devices.

Although the invention has been described with respect to an exemplary embodiment, it will be appreciated by those skilled in the art that various modifications, substitutions, etc., some of which have been mentioned above, may be made without departing from the spirit and scope of the invention as defined by the appended claims.

What is claimed is:

1. In a computer peripheral device having a driven element, a controllable element and control means coupled to said controllable element and operative in responsive to a plurality of different power supply voltages for controlling said controllable element, an improved power supply means coupled to said control means for supplying said plurality of power supply voltages to said control means, said power supply means comprising:

a motor capable of being driven at a predetermined rate of speed; said driven element being coupled to and driven by said motor;

means coupled to said motor and responsive to the motor being driven at said predetermined rate of speed for generating said plurality of power supply voltages, said means for generating comprising an alternator coupled to and driven by said motor for generating a plurality of output signals and means for deriving said plurality of power supply voltages from said plurality of output signals; and means coupled to said means for generating for supplying said plurality of power supply voltages to said control means.

2. In a computer peripheral device having a driven element, a controllable element and control means coupled to said controllable element and operative in response to a power supply voltage of a predetermined level for controlling said controllable element, an improved power supply means coupled to said control means for supplying said power supply voltage to said control means, said power supply means comprising:

a motor capable of being driven at a predetermined rate of speed; said driven element being coupled to and driven by said motor;

means coupled to said motor and responsive to the motor being driven at said predetermined rate of speed for generating said power supply voltage, said means for generating comprising an alternator coupled to and driven by said motor for generating an output signal, said alternator having a set of 3-phase windings for generating three phase-displaced a-c signals together constituting said output signal, said a-c signals each having the same peak amplitude and frequency, and said means for generating also comprising means for deriving said power supply voltage from said output signal, said means for deriving including means for rectifying said a-c signals to derive a d-c signal having a ripple frequency equal to a multiple of the frequency of said a-c signals; and means coupled to said means for generating for supplying said power supply voltage to said control means.

3. The computer peripheral device of claim 2, wherein said means for deriving also includes means coupled to said means for rectifying for smoothing out the ripple component of said d-c signal with the resultant d-c signal constituting said power supply voltage.

4. The computer peripheral device of claim 2, wherein said ripple frequency is equal to six times the frequency of each a-c signal.

5. The computer peripheral device of claim 2, wherein said means for rectifying includes a full-wave rectifier so that said ripple frequency will be equal to six times the frequency of each a-c signal.

6. The computer peripheral device of claim 3, wherein said means for smoothing includes a filter capacitor.

7. The computer peripheral device of claim 5, wherein said means for deriving also includes a filter capacitor coupled to said full-wave rectifier for smoothing out the ripple component of said d-c signal with the resultant d-c signal constituting said power supply voltage.

8. In a disk drive including a support frame, a magnetic recording disk mounted to said support frame for rotation about its axis, at least one electromagnetic head mounted to a carriage and positionable relative to said magnetic recording disk by movement of said carriage along a predefined path, a linear actuator for selectively moving said carriage relative to said support frame along said predetermined path, said linear actuator including a drive shaft, and control means coupled to said linear actuator and operative in response to a power supply voltage of a predetermined level for controlling said linear actuator, an improved power supply means coupled to said control means for supplying said power supply voltage to said control means, said power supply means comprising:
- a motor capable of being driven at a predetermined rate of speed, said drive shaft being coupled to and driven by said motor;
- means coupled to said motor and responsive to the driving of said motor at said predetermined rate of speed for generating said power supply voltage, said means for generating comprising an alternator coupled to and driven by said motor for generating an output signal, and means for deriving said power supply voltage from said output signal; and
- means coupled to said means for generating for supplying said power supply voltage to said control means.

9. The disk drive of claim 8, wherein said alternator has a set of 3-phase windings for generating three phase-displaced a-c signals together constituting said output signal, said a-c signals each having the same peak amplitude and frequency, and said means for deriving includes means for rectifying said a-c signals to derive a d-c signal having a ripple frequency equal to a multiple of the frequency of said a-c signals.

10. The disk drive of claim 9, wherein said means for deriving also includes means coupled to said means for rectifying for smoothing out the ripple component of said d-c signal with the resultant d-c signal constituting said power supply voltage.

11. In a computer peripheral device having a controllable element and control means coupled to said controllable element and operative in responsive to a plurality of different power supply voltages for controlling said controllable element, an improved power supply means coupled to said control means for supplying said plurality of power supply voltages to said control means, said power supply means comprising:
- a motor capable of being driven at a predetermined rate of speed;
- means coupled to said motor and responsive to the motor being driven at said predetermined rate of speed for generating said plurality of power supply voltages, said means for generating comprising an alternator coupled to and driven by said motor for generating a plurality of output signals and means for deriving said plurality of power supply voltages from said plurality of output signals, wherein said alternator includes a plurality of sets of 3-phase windings, each set capable of generating three phase-displaced a-c signals together constituting one of said output signals, the a-c signals generated by each set of 3-phase windings having the same peak amplitude and frequency, and wherein said means for deriving includes means for rectifying the a-c signals generated by each set of 3-phase windings to derive a d-c signal associated with such set, each d-c signal having a ripple frequency equal to a multiple of the frequency of each of the a-c signals generated by the associated set of 3-phase windings; and
- means coupled to said means for generating for supplying said plurality of power supply voltages to said control means.

12. The computer peripheral device of claim 11 wherein said means for deriving also includes means coupled to said means for rectifying for smoothing out the ripple component of each d-c signal with the resultant d-c signals respectively constituting said plurality of power supply voltages.

13. In a disk drive including a support frame, a magnetic recording disk mounted to said support frame for rotation about its axis, at least one electromagnetic head mounted to a carriage and positionable relative to said magnetic recording disk by movement of said carriage along a predefined path, a linear actuator for selectively moving said carriage relative to said support frame along said predefined path, said linear actuator including a driven element, and control means coupled to said linear actuator and operative in response to a power supply voltage of a predetermined level for controlling said linear actuator, an improved power supply means coupled to said control means for supplying said power supply voltage to said control means, said power supply means comprising:
- a motor capable of being driven at a predetermined rate of speed;
- said driven element being coupled to and driven by said motor;
- means coupled to said motor and responsive to the driving of said motor at said predetermined rate of speed for generating said power supply voltage, said means for generating comprising an alternator coupled to and driven by said motor for generating an output signal, and means for deriving said power supply voltage from said output signal; and
- means coupled to said means for generating for supplying said power supply voltage to said control means.

14. The disk drive of claim 13, wherein said alternator has a set of 3-phase windings for generating three phase-displaced a-c signals together constituting said output signal, said a-c signals each having the same peak amplitude and frequency, and said means for deriving includes means for rectifying said a-c signals to derive a d-c signal having a ripple frequency equal to a multiple of the frequency of said a-c signals.

15. The disk drive of claim 14, wherein said means for deriving also includes means coupled to said means for rectifying for smoothing out the ripple component of said d-c signal with the resultant d-c signal constituting said power supply voltage.

* * * * *